Nov. 9, 1965 T. H. BRAUN 3,217,242
CIRCULAR POTENTIOMETER-LIKE STRUCTURE HAVING THREE TERMINAL
JUNCTIONS SPACED 120 DEGREES APART FOR DETERMINING
INFORMATION RELATIVE TO OIL AND GAS FORMATIONS
Original Filed Feb. 24, 1959 11 Sheets-Sheet 1

INVENTOR,
THEODOR H. BRAUN
BY
ATTORNEY

INVENTOR,
THEODOR H. BRAUN

Nov. 9, 1965 T. H. BRAUN 3,217,242
CIRCULAR POTENTIOMETER-LIKE STRUCTURE HAVING THREE TERMINAL
JUNCTIONS SPACED 120 DEGREES APART FOR DETERMINING
INFORMATION RELATIVE TO OIL AND GAS FORMATIONS
Original Filed Feb. 24, 1959 11 Sheets-Sheet 3

INVENTOR.
THEODOR H. BRAUN
BY
ATTORNEY

INVENTOR,
THEODOR H. BRAUN

Nov. 9, 1965 T. H. BRAUN 3,217,242
CIRCULAR POTENTIOMETER-LIKE STRUCTURE HAVING THREE TERMINAL
JUNCTIONS SPACED 120 DEGREES APART FOR DETERMINING
INFORMATION RELATIVE TO OIL AND GAS FORMATIONS
Original Filed Feb. 24, 1959 11 Sheets-Sheet 9

INVENTOR.
THEODOR H. BRAUN
BY
ATTORNEY

United States Patent Office 3,217,242
Patented Nov. 9, 1965

3,217,242
CIRCULAR POTENTIOMETER-LIKE STRUCTURE HAVING THREE TERMINAL JUNCTIONS SPACED 120 DEGREES APART FOR DETERMINING INFORMATION RELATIVE TO OIL AND GAS FORMATIONS
Theodor H. Braun, Pacific Palisades, Calif., assignor to The Superior Oil Company, Los Angeles, Calif., a corporation of California
Original application Ser. No. 795,288, Feb. 24, 1959, now Patent No. 3,106,638, dated Oct. 8, 1963. Divided and this application Nov. 13, 1962, Ser. No. 236,883
5 Claims. (Cl. 324—1)

This invention relates to devices employed to obtain information useful in subsurface exploration, and more particularly to a device for use in determining the positions of oil and gas formations in oil and gas fields, whereby the fields may be developed in a most effective and efficient manner.

This application is a division of co-pending application Serial Number 795,288 filed February 24, 1959, now Patent No. 3,106,638, for Method and Apparatus for Determining Information Relative to Oil and Gas Formations. Said co-pending application is in turn a continuation-in-part of application Serial Number 670,933 filed July 10, 1957, for Method and Apparatus for Determining Information Relative to Oil and Gas Formations, now abandoned. The benefit of the filing date of each of said applications is hereby claimed for the instant application.

In the first place, many sizeable deposits of gas and oil have been lost as a result of a lack of knowledge of faults or certain subsurface layers of slipped strata. As a matter of fact, for a very large number of reasons, it is desirable to have structural maps of subsurface faults or strata in oil fields in order that they may be worked most efficiently. For example, the simple placement of oil wells can radically effect both the maximum rate of production and the ultimate recovery from a single oil pool.

A great deal has been accomplished to the present time concerning these problems. One of the most successful of all metering and recording apparatus used in solving these problems is known as a "Microlog Continuous Dip Meter," also the title of an article by Pierre de Chambrier in Geophysics, volume XVIII, No. 4, October 1953. This apparatus does not actually give any indication of the dip angle or of the position of subsurface strata at any time during its operation, contrary from what its title might imply. However, it does give a continuous log, i.e. a written record of certain variables versus well depth, viz. the radius or diameter of a well bore into which the apparatus is lowered, the deviation or inclination of the well from the vertical, the azimuth of the inclination, the azimuth of the apparatus itself as it turns in the well bore, and the resistance of the strata. Resistance logs are taken between three pairs of points, each pair being an inch or two apart in the direction of the axis of the well bore. The pairs of points are angularly spaced 120° apart substantially in a single plane perpendicular to the axis of the well. For this reason, appropriate measures are taken to maintain the tool of which they form a part centered within the well bore.

From the log obtained with this resistance log apparatus, "interpretation apparatus" is used. That is, apparatus for determining the dip angle and azimuth of planes of strata recognizable from the resistance logs.

To the present time, perhaps only two methods of determining the dip angle and azimuth of a formation from resistance logs have been used very widely. The first of these is the dip meter "interpretation apparatus" described in the above-mentioned Geophysics article. This includes the use of a movable plane or a platform set at three distances from a reference platform by three rods extending perpendicularly from the reference platform and hinged to the movable platform. The positions of the three rods are then adjusted to be equal to three distances from an arbitrarily selected depth on the resistance logs of similarly cyclically occurring portions on each curve. The dip angle and azimuth of a corresponding formation are then measured as the dip angle and azimuth of the movable platform relative to the reference platform.

Alternatively, a graphic method of solving for both the dip angle and azimuth of a formation from the correspondence of the resistance logs has been used. However, the "interpretation apparatus" and the graphic type solution both are cumbersome and time consuming to perform. In addition, the dip meter "interpretation apparatus" is bulky in size and expensive to manufacture.

It is therefore an object of the invention to provide apparatus adapted to receive electrical logging information inputs which may be easily and quickly operated to obtain the dip angle and azimuth of oil and gas formations.

It is another object of the invention to provide small, light weight apparatus adapted to receive logging information input signals which may be operated to obtain the dip angle and azimuth of oil and gas formations.

The present invention achieves these and other objects of the invention and overcomes the above-described disadvantages of prior art methods of solving for the dip angle and azimuth of oil and gas formations by providing three impedance means each having one end electrically connected to an adjacent one of another to provide three terminal junctions, the impedance means being arranged substantially in a planar loop. Separately adjustable input means are then connected to each of the terminal junctions for impressing a corresponding potential on each having a common reference ground potential, each of the potentials being proportional to three line segments between three points in a plane of a selected formation and three corresponding points lying on a circle in a predetermined plane of reference. Each of the points in the plane of reference is located at an angle therein corresponding to the position of the three terminal junctions. Each of the points in the plane of reference is also located at an angle therein corresponding to the angular position of the three terminal junctions around the planar loop, each of the line segments being perpendicular to the plane of reference. A pair of wiper contacts are located on the planar loop opposite each other at an angle substantially 180° and a voltmeter is electrically connected between the wiper contacts, the voltmeter having a finite series internal impedance, whereby it may be calibrated to read directly in the dip angle of the selected formation. Means are also provided for moving the wiper contacts on the planar loop in the same direction substantially simultaneously, whereby the dip angle of the selected formation may be registered on the voltmeter by moving the wiper contacts to a position to cause the voltage to read a maximum value and the direction of dip of the selected formation may be determined by noting the angular position of the wiper contacts relative to those of the impedance means. Alternatively, a zero output signal may be derived and dip angle and azimuth computed on the voltage appearing between a second pair of wipers disposed 90 mechanical degrees from the first pair.

In a preferred embodiment of the invention, the three impedances are arranged in a potentiometer-like structure including a resistive winding arranged in a planar circle. Potentials are then impressed on three fixed taps on the resistive winding representative of the positions of three points above an arbitrarily plane of reference perpendicular to the axis of a well bore from which corresponding resistance logs are taken.

Hence, the apparatus of the invention may be easily and quickly operated simply by rotating the wipers on the resistive winding in the same direction and substantially simultaneously until a maximum value is registered by the voltmeter. Assuming the input potentials are adjusted to be proportional to three corresponding relative depths of three similar waveforms on corresponding resistance logs, the voltmeter may be calibrated to read directly in degrees so that the dip angle of a formation may be read from it directly. The rotation of the wipers on the resistive winding may also be calibrated in degrees whereby the azimuth of the same formation may be read directly from it. This is, in fact, read when the wipers are appropriately positioned for a maximum voltmeter reading. The theory of operation of the apparatus of the invention will be explained in detail hereinafter.

From the foregoing, it will be apparent that the invention not only may be easily and quickly operated, but that it also can be economically manufactured of relatively few uncomplicated, inexpensive component parts. Moreover, it will occupy a very small physical space and will be very light in weight.

According to special features of the invention, corrections for the inclination of a well bore from the vertical and for change in the diameter of a well bore may be made easily, quickly, and simultaneously as the dip angle and azimuth of a formation are obtained from the apparatus of the invention. Correction for a well bore inclination is made by the use of a second potentiometer-like structure very similar to that of the first-mentioned above. It is, in fact, used with the first-mentioned structure. Corrections for changes in well bore diameter are made by simply adjusting the input potentials to the fixed taps on the first-mentioned resistive winding simultaneously. Specific details of these structures and the theory of operation of both of these features will be explained in greater detail hereinafter.

These and other objects and advantages of the present invention will be better understood when considered with the following description taken in connection with the accompanying drawings made a part of this specification, wherein several embodiments are illustrated by way of example. The device of the present invention is by no means limited to the specific embodiments illustrated in the drawings since they are shown merely for purposes of description.

Figure 1:
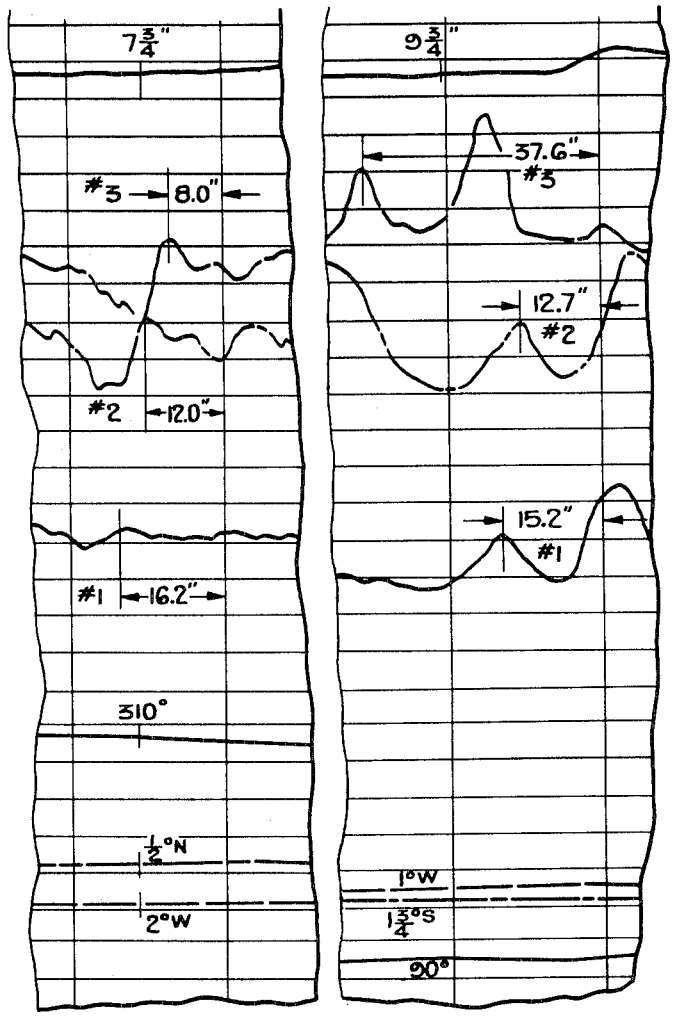
FIG. 1 is a log plot of recorded curves of two actual runs in two oil wells with numerically calculated results indicated in a sample data sheet normally used.

The problem of determining the dip angle and azimuth of the plane of strata or a fault intersected by the bore hole of an oil well is perhaps very well explained in the above-mentioned article in Geophysics. As stated previously, an electrical log of the resistance between two axially spaced electrodes about one to two inches apart is taken. This log is matched with two others taken 120° apart in the bore hole of an oil well simultaneously. Maxima and minima of all three curves occurring at different depths indicate the position of the plane of strata intersecting the well bore. The dip angle and azimuth of a given formation then may be determined by comparing the difference in heights at which certain similar maxima and minima occur, these indicating the passage of a particular electrode through the same formation. These differences in height are then used to compute the dip angle and azimuth of a particular formation. The essential features of the logging instrument, which forms no part of this invention, are clearly and succinctly stated on pages 930 through 935 in the above-mentioned article. On page 937 of this article, a typical plot of the electrical logs of electrodes labeled I, II, and III are shown with plots of the azimuth of electrode I, the W/E, west-east component of the drift angle of the well bore, and the S/N, south-north, component of the drift angle of the well bore, are shown. The absolute azimuth of any formation may be determined only by determining the rotation of the tool in the well. The azimuth of electrode I is recorded for this reason as the tool is lowered into a well bore.

In order to obtain a reasonably accurate measurement of the dip angle and azimuth of a formation, the inclination of the hole must also be recorded. This may be done in either one of two ways. In the instance shown on page 937 of the Chambrier article, this is done by recording the west-east and south-north component of any well bore deviation or inclination from the vertical. This may be done in another way by recording the azimuth of the hole inclination and its dip angle.

It is to be noted that on page 938 of the Geophysics article, it is elementary that the azimuth of $\beta$ a formation may be calculated as $$\tan \beta = \frac{\lambda - 1}{+1} \tag{1}$$

where $$\lambda = \frac{h_2}{h_1} \tag{2}$$

$h_1$ being the elevation difference between the lowest curve and the curve following it at a particular maximum or minimum where measurements are generally taken, the curve following the lowest curve following it in the sense that it is followed in the cyclic repetition I–II–III–I, where the Roman numerals are employed to indicate or identify the corresponding electrodes. In the above-mentioned cases, $h_2$ is the elevation of the remaining curve above the lowest one. Using the same definitions, the apparent angle of dip $\alpha_a$ may be expressed in terms of a trigonometric function as follows:

$$\tan \alpha_a = \frac{2h_1(\lambda^2 - \lambda + 1)^{1/2}}{3r} \tag{3}$$

where $r$ is the radius of the well bore.

It is desirable to record the radius of the well bore for the reason that preferably the sets of electrodes disposed at 120° apart are mounted on belly springs to be pressed into contact with the well bore. The fact that the well bore will vary in diameter will, of course, make the electrodes spaced different distances apart. This variation, therefore, in accordance with the invention, is recorded and utilized in the determination of the azimuth and dip angle of a formation. As explained in the Geophysics article, $\alpha_a$ represents the angle between a formation and the plane of the three sets of electrodes, i.e. a plane perpendicular to the axis of the well bore. It is to be noted that this angle $\alpha_a$ is not the true angle unless corrected for the hole inclination. This is also accomplished in accordance with the invention.

Still further, it is to be noted that $\beta$ is the azimuth of the formation and will be recorded relative to the azimuth of electrode I. This is also corrected in accordance with the invention by utilizing the recorded information of the absolute azimuth of one of the electrodes.

The computations of the azimuth and dip angle of formations in a sample log for a well number 1 and a well number 2 are shown in FIG. 1 with separate logs for the wells. Computations were made on the basis of identification of the three electrode sets number I, II and III as indicated at the appropriate curves with depths from a predetermined reference line of 8,834 feet equal to 16.2 inches, 12.0 inches and 8.0 inches, respectively. It is to be noted that the average depth of the three electrodes is labeled 8,833 feet in connection with the log of well number 1 and 3,706 feet in connection with the log of well number 2. It is to be noted that at the average depths selected at well number 1, the azimuth of electrode I is 310°, the hole deviation is ½° north and 2° west and that the hole diameter is 7¾ inches. In well number 2, the azimuth of electrode I is 90° and the hole deviation is 1° west and 1¾° south, and the well bore diameter is 9¾ inches.

The azimuth and dip angle of a formation may be calculated in various ways, Equations 1, 2, and 3 being only representative of the particular manner in which they may be calculated. A so-called dip meter "interpretation apparatus" is shown on page 939 of the Geophysics article. This device is a mechanical device and rather cumbersome. The present invention is electrical and easy to handle and to operate. Other than the dip meter "interpretation apparatus" only graphical methods of solution are presently employed as stated previously.

Those not already entirely familiar with the use of the information of electrical logging apparatuses may be interested in the bibliography at the end of the de Chambrier reference. Other articles are as follows:

"Calculating Dip and Strike From Continuous Dip Meters" by B. Osborne Prescott, the Oil and Gas Journal, March 17, 1955, page 118; "The Continuous Dip Meter" by Jack Grynberg and M. I. Ettinger, The Oil and Gas Journal, April 1, 1957, page 166.

The present invention provides substantial advantages over angle determination methods of prior art by providing an electrical circuit from which measurements may be taken to determine the azimuth and dip angle of a formation in an oil well using three input voltages corresponding respectively to the electrode resistances recorded by the three sets of electrodes I, II and III indicated on the logs of FIG. 1.

Figure 2:
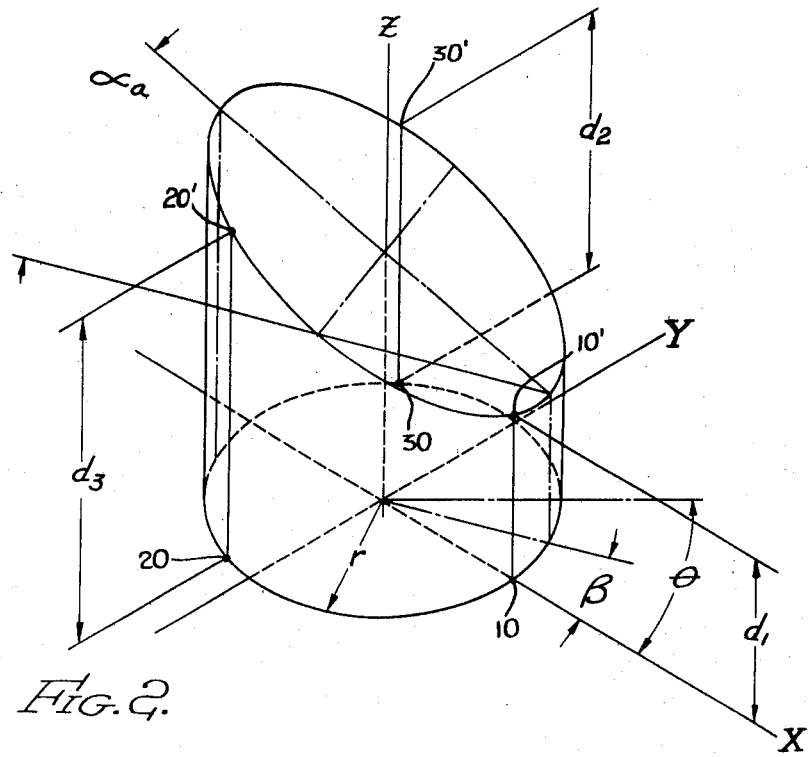
FIG. 2 is a perspective view of a plane of a formation illustrating the principles of the electrical problem of generating two functions of three variables to find the location of the formations.

It is to be noted that in the log of well number 1 in FIG. 1, an arbitrary reference line of 8,834 feet is taken from which three corresponding maxima are measured. In the case of well number 2, a depth of 3,708 feet is taken as an arbitrary reference depth. The actual measurement which must be made from these depth indications, the depth being from any selected reference line, may be better understood with reference to FIG. 2. In FIG. 2 a three-dimensional coordinate system of $x$, $y$ and $z$ is shown, the position of electrode set number I being indicated at 10, the position of electrode set number II being indicated at 20, and the position of electrode set number III being indicated at 30. The distances from a corresponding reference plane corresponding to the plane of the three electrodes are indicated at $d1$, $d2$ and $d3$. The reference plane is the $xy$ plane and distances $d1$, $d2$ and $d3$ correspond to the three distance measurements indicated on the two log plots of FIG. 1 for wells numbers 1 and 2, respectively. A plane through three points 10′, 20′ and 30′ at the upper ends of line segments $d1$, $d2$ and $d3$, therefore, defines the plane of a formation having the particular resistance characteristic identified in a particular log plot. It is to be noted at this point that the use of the word "log" actually means a written record and does not mean a logarithmic plot.

Line segments $d1$, $d2$ and $d3$ are elements of a cylinder identified as such by shading in FIG. 2. The intersection of the cylinder by a plane through points 10′, 20′ and 30′ forms an ellipse 40. It is to be noted that the azimuth projection of the major axis indicated at 42 of the ellipse on the $xy$ plane forms an angle $\beta$ which is in fact the azimuth of the formation defined by the points 10′ 20′ and 30′ relative to the $y$ axis. The absolute azimuth of the electrode at which is also recorded in accordance with the invention, is not always the same because of twisting of a tool in an oil well. The apparent angle of dip of the formation is indicated at the angle $\alpha_a$, i.e. the angle between the major axis 42 of the ellipse 40 and a plane perpendicuar to the $z$ axis of the coordinate system shown in FIG. 2.

Thus the problem solved by the present invention is that of providing an electrical system by which the azimuth of the major axis 42 may be determined and in addition to the angle of it with respect to the $xy$ plane or $\alpha_a$. Ideally, the information may be found by determining the maximum height of the ellipse 40 above the $xy$ plane. Alternatively and independent of the absolute magnitudes of $d1$, $d2$ and $d3$, which is desired, this may be accomplished by taking the maximum difference in height $\Delta z$ occurring between the intersection of planes through the $z$ axis at angles $\theta$ and $\theta + \pi$ in radians with the ellipse 40. It is to be noted that such planes will intersect the ellipse 40 at two places on opposite sides of the "pole" $z$. If we arbitrarily assign a function $$\frac{\Delta z}{2r} = F$$

where $r$ is the radius of the electrodes 10, 20 and 30 as indicated in FIG. 2, this function may be obtained from solid geometry as follows:

$$F = \tan \alpha_a \cos (\beta - \theta) \qquad (4)$$

Ideally, in accordance with the invention, Equation 4 should be mechanized with electrical circuitry. It is to be noted, however, that for $F = F_{max}$, i.e. F is a maximum value and $\theta = \theta_m = \beta$. Hence, it is not necessary that the electrical analogy be exactly true to Equation 4 for absolute accuracy except where the maximum value where $F = F_{max}$ occurs. This for the reason that only at $\theta = \theta_m = \beta$ does $F = \tan \alpha_a$. Thus by calibrating a meter to read as $\alpha_a = \arctan F$, $\alpha_a$ may be read directly when $\theta$ is adjusted to be equal to $\beta$. This may be done by observing F as $\theta$ is varied manually or automatically. Furthermore, when $\theta_m$ for $F = F_{max}$ is determined, $\beta$ may be automatically determined by metering $\theta$ at $F = F_{max}$. Hence it is necessary to arrive at an electrical circuit for $F = f(\theta)$ to correspond to the function of Equation 4 particularly at the point $\theta = \beta$. In this manner, as stated previously, $\theta$ may be varied manually or by a servo to obtain $F = F_{max}$. $\alpha_a$ may be determined from the relationship $F_{max} = \tan \alpha_a$ and $\beta$ may be determined from the relationship $\theta_m = \beta$. Both of these may be read from mechanically or electrically indicating instruments depending upon the mechanization of Equation 4.

In the practice of the present invention, it will be of interest to note that the function F can easily be derived from general rectangular and cylindrical coordinate equations for a plane.

Suppose $z1$ is the distance from the $xy$ plane to the intersection of the plane $\theta$, in cylindrical coordinates, with the canted ellipse represented by the intersection of the cylinder $x^2+y^2=r^2$ and the plane through points 10', 20' and 30'. Let $z2$ then be equal to the distance from the $xy$ plane to an intersection with the same curve by the plane $\theta+\pi$ in radians.

The general equation for the plane through points 10', 20' and 30' or any plane in rectangular coordinates $x$, $y$ and $z$ is $$Ax+By+Cz=D$$

where A, B, C and D are constants. The distance of interest in terms of $\theta$ is $$z2-z1=\Delta z.$$

In cylindrical coordinates $$x=\rho \cos \theta$$
$$y=\rho \sin \theta$$

But for the cylinder $x^2+y^2=r^2$, $\rho=r$, a constant. Hence $$z1=-\frac{Ar}{C}\cos \theta - \frac{Br}{C}\sin \theta + D$$

$$z2=+\frac{Ar}{C}\cos (\theta+\pi) + \frac{Br}{C}\sin (\theta+\pi) + D$$

$$z2-z1=\Delta z=2r\left(\frac{A}{C}\cos \theta + \frac{B}{C}\sin \theta\right)$$

If $$\frac{\Delta z}{2r}=F$$

and we set $$\tan \beta = \frac{B}{A}$$

and $$\tan \alpha_a = \left(\frac{A^2}{C}\right) + \left(\frac{B}{C}\right)^{2 \, 1/2}$$

then $$F = \tan \alpha_a \cos (\beta - \theta)$$

from the identity $$\cos \beta \cos \theta + \sin \beta \sin \theta = \cos (\beta - \theta)$$

From simple geometric relationships $$\tan \beta = \sqrt{3}\frac{d_2-d_3}{2d_1-d_2-d_3}$$

and $$\tan \alpha_a = \frac{[3(d_2-d_3)^2 + (2d_1-d_2-d_3)^2]^{1/2}}{3r}$$

It is interesting to note that the apparatus of the invention solves these last two expressions in a very simple and expeditious manner. Certainly after the computation of $$\frac{\partial z}{\partial y}=\sqrt{3}\frac{d_2-d_3}{3r}$$

$$\frac{\partial z}{\partial x}=\frac{2d_1-d_2-d_3}{3r}$$

The solution for $\tan \beta$ and $\tan \alpha_a$ is a right triangle solution with legs $$\frac{\partial z}{\partial y}, \frac{\partial z}{\partial x}$$

angle $\beta$, and hypotenuse $\tan \alpha_a$. That is $$\tan \beta = \frac{\frac{\partial z}{\partial y}}{\frac{\partial z}{\partial x}} = \frac{\partial x}{\partial y}$$

and $$\tan \alpha_a = \left(\frac{\partial z}{\partial y}\right)^2 + \left(\frac{\partial z}{\partial x}\right)^{2 \, 1/2}$$

Hence, the present invention reduces a complicated double conversion to a simple single conversion, that is, the complicated conversion of $d1$, $d2$ and $d3$ to $$\frac{\partial z}{\partial y} \text{ and } \frac{\partial z}{\partial x}$$

and the complicated right triangle solution for $$\frac{\partial x}{\partial y}$$

and the quantity $$\left[\left(\frac{\partial z}{\partial x}\right)^2 + \left(\frac{\partial z}{\partial y}\right)^2\right]^{1/2}$$

Figure 3:
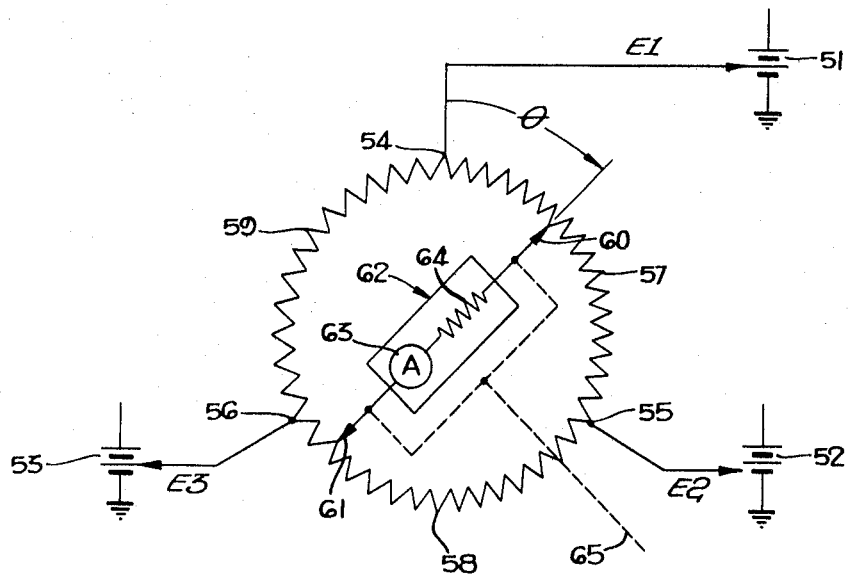
FIG. 3 is a schematic diagram of a basic embodiment of the invention.

Apparatus which may be employed to determine the azimuth and dip angle of a formation with voltages E1, E2 and E3 arranged to be proportional to differential depths $d1$, $d2$ and $d3$, respectively, is indicated at FIG. 3. At first glance, such an arrangement will not appear to be operative. The arrangement includes variable voltage sources 51, 52 and 53 connected at corresponding fixed taps 54, 55 and 56 on a potentiometer type structure having three resistive windings 57, 58 and 59 connected between pairs of taps 54–55, 55–56 and 56–54, respectively. Two movable wipers 60 and 61 located 180° apart are maintained in contact on the resistive windings 57, 58 and 59 and a voltmeter 62 is connected between them. The voltmeter includes an ammeter 63 having a serially connected resistance 64. It is the internal resistance 64 of the voltmeter 62 that provides a continuous reading of the ammeter 63 to a single maximum peak. The voltage at this peak is approximately proportional to the dip angle alpha of a formation represented by the three voltages E1, E2, and E3. The angular position of wipers 60 and 61 may be adjusted manually as indicated at 65. As this is done, the maximum reading of ammeter 63 is taken. The angle $\theta_m$ to which the wipers 60 and 61 are turned relative to the fixed tap 64 for a peak voltmeter reading is equal to the azimuth of the formation corresponding to the particular settings of voltages E1, E2 and E3. It will be noted that the voltages E1, E2 and E3 are D.C. or in phase A.C. voltages manually adjusted in amplitude to correspond to the particular differential depths $d1$, $d2$ and $d3$. Alternatively, two pairs of wipers 90 degrees apart could be used and one pair set to read zero potential, which null is easier to ascertain.

The use of a voltmeter with a finite internal impedance may be best understood by considering a specific condition where the difference between E1 and E2 and E2 and E3 are identical. In this case, a maximum reading will be obtained on ammeter 63 for any $\theta$ setting from zero to sixty degrees from fixed tap 54. Before going any further, it is to be noted that the 120° spacing of the fixed taps 54, 55 and 56 correspond to the 120° spacing of electrodes 10, 20 and 30 shown in FIG. 2. This is the common practice of spacing electrodes 10, 20 and 30. They can be spaced otherwise, however, error is introduced and both measurement and calculation would not be kept below a predetermined minimum for any combination of the azimuth and dip angle of a formation. Thus, the 120° spacing is not absolutely necessary but definitely much preferred and desirable for this reason. It is to be noted that the circular arrangement of the resistance windings 57, 58 and 59 for a simple connection of wipers 60 and 62 thereto. However, different geometric arrangements may be made which can in fact produce greater accuracy with the apparatus of the invention, although that is not necessary as will be seen hereinafter where accuracies required to determine the position of formations may be obtained with resistance windings arranged in the circular form shown in FIG. 3.

The invention as simply shown in FIG. 2 is susceptible to exact analytical design. This has not been done because, as stated previously, acceptable accuracies have been obtained simply by meter calibration and the use of practical circuit components. Such an arrangement of circuit components will be described hereinafter in connection with FIG. 5. However, the approach to an analytial design of the simplest apparatus as shown in FIG. 3 may be made by writing an expression for a difference of potential $e_T$ appearing between wipers 60 and 61 as a function of $\theta$ and the circuit constants shown in FIG. 3. The potential $e_T$ may be defined as follows:

$$e_T = \frac{3Ce_1(1-2K)}{4C+3+8K-10K^2} + \frac{Ce_2(3+2K)}{6C+9+(5C+9)K+6K^2} \quad (5)$$

where C is equal to two times the ratio of the internal resistance of voltmeter 62 to the resistance of one of the windings 57, all these being considered to be equal; where $e_1 = E1-E2$; where $e_2 = E2-E1$, a reference potential of $E1=0$ being selected for this equation. K in this equation also may be defined as follows:

$$K = 3\frac{\theta}{2\pi}$$

where $\theta$ is in radians and $\pi = 3.1416$ radians.

The development of Equation 5 by no means is the complete solution to designing the simple apparatus shown in FIG. 3. In order to determine the optimum design for C, $\beta_c$, i.e. the output signal proportional to the actual $\beta$ for given settings E1, E2 and E3 and $\alpha_{ac}$ and an $\alpha_{ac}$, or a computed value of $\alpha_a$ must be plotted for all combinations of E1, E2 and E3 simply to obtain $\beta_c$ and $\alpha_{ac}$. To obtain these from Equation 5 analytically, the derivative of $e_T$ with respect to K must be taken and set equal to zero. At this point $$\theta_m = 2\pi\frac{K_m}{3} = \beta_c$$

may be determined. By substituting $\beta_c$ into Equation 5, a value of $e_T$ may be developed proportional to or, in fact, equal in volts or millivolts or the like to $\alpha_{ac}$. Then from these two analytical determinations, errors should be plotted from ideal $\beta$ and $F_{max}$ based on analytical calculations from Equation 4. C then should be adjusted for a minimum error of both $\alpha_{ac}$ and $\beta_c$. Since two output variables $\beta_c$ and $\alpha_{ac}$ are produced simply by one design constant C, it is to be noted that a compromise may be necessary to reduce the error for both to a reasonable value. Furthermore, if the accuracy of one variable is more important than the other, C may be designed to minimize the error of the one with very little regard for the error of the other within certain ranges of angles. As a practical matter, in the empirical design of the circuit of the present invention, the angle of dip is really not too important. For this reason an accuracy of ±2 degrees in azimuth of a formation was set and accomplished. Only an accuracy of ±10% was obtained for the magnitude of the dip angle in accordance with the preferred embodiment of the invention. However, this accuracy is generally acceptable for all geological work.

Figure 5:
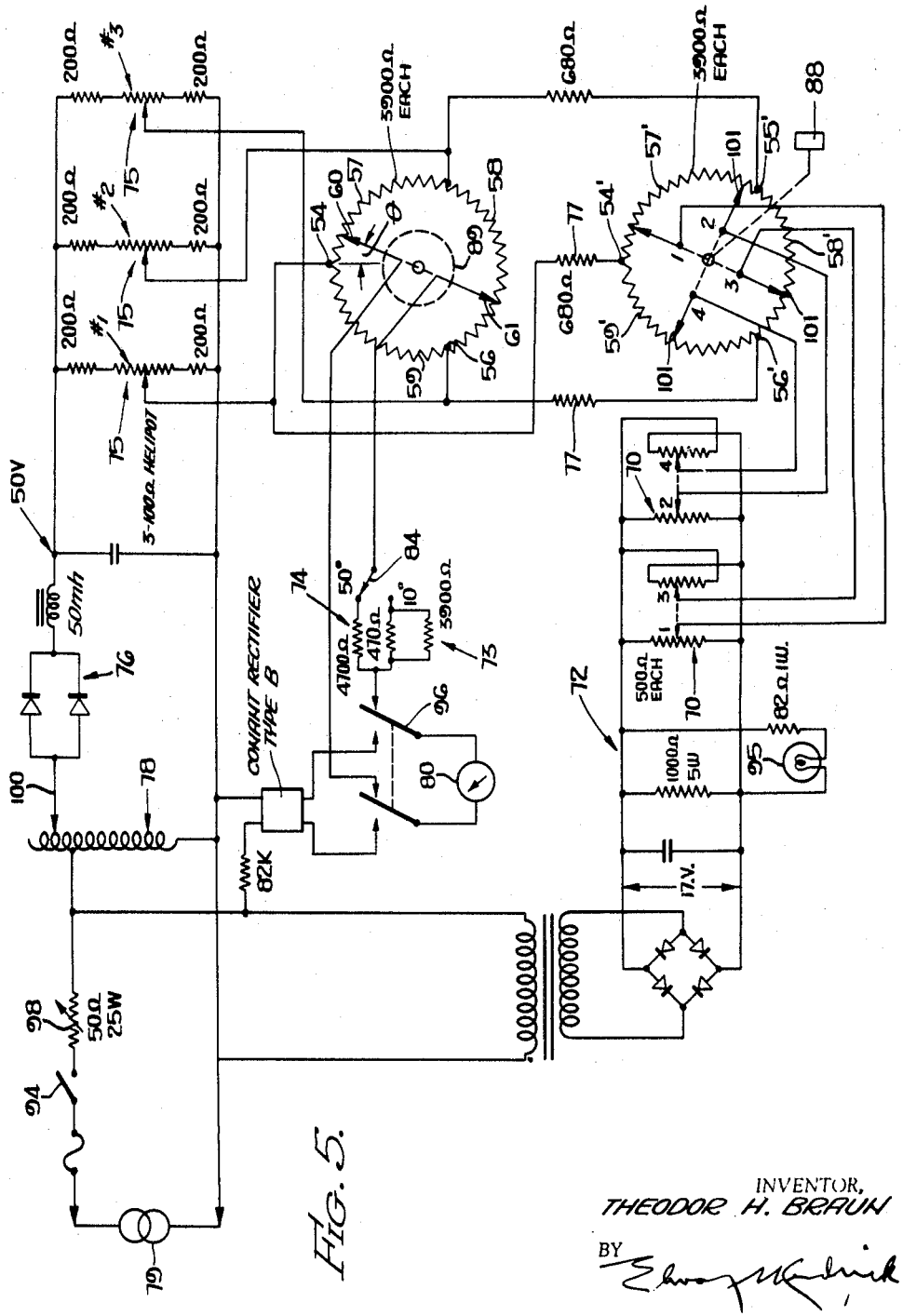
FIG. 5 is a schematic diagram of a preferred embodiment of the invention.

The detailed nature of the analytical design of the invention will be better understood when the resistance values for four types of circuit elements are introduced in accordance with the preferred embodiment of the apparatus of the invention. For example, as can be seen in FIG. 5 resistances 57, 58 and 59 are preferably 900 ohms as are resistances 57', 58' and 59' of a similar circuit arrangement for the introduction of N/S or north-south and E/W or east-west hole deviations. Inputs to resistors 57', 58' and 59' are provided at fixed taps 54', 55' and 56' by corresponding input potentiometers 70, a pair for each direction of deviation. These input impedances are connected to a rectifier supply 72. A different set of voltmeter internal resistors 73 and 74 are also shown in FIG. 5. In addition, input impedances 75 are provided for fixed taps 54, 55 and 56, respectively, at the ends of resistors 57, 58 and 59. Thus, in addition to the constant C of Equation 5, the resistances of internal resistors 73 and 74 must both be taken into consideration. In addition, the resistances of potentiometers 70 and 75 must be considered with the resistance of resistors 57', 58' and 59' also considered. Still further, resistors 77 of 680 ohms are connected between corresponding fixed taps 54, 54', 55, 55' and 56, 56'.

In the design of the preferred embodiment of the invention shown in FIG. 5, the relationship of the resistances of each of these circuit elements must be taken into consideration. It is to be noted that $e_1$ and $e_2$ found in Equation 5 will be a function of these several variables. Hence, design considerations from an analytical standpoint are generally considered much too cumbersome to be of help.

The same voltage, provided by rectifier assembly 76, is impressed upon input impedances 75 which are connected to resistances 57, 58 and 59, respectively. The system is adapted to work from a 115 volt alternating current line, an alternating current source 79 being indicated in FIG. 5. The magnitude of the alternating voltage is adjusted at an autotransformer 78 in accordance with changes in well bore diameter.

Figure 4:
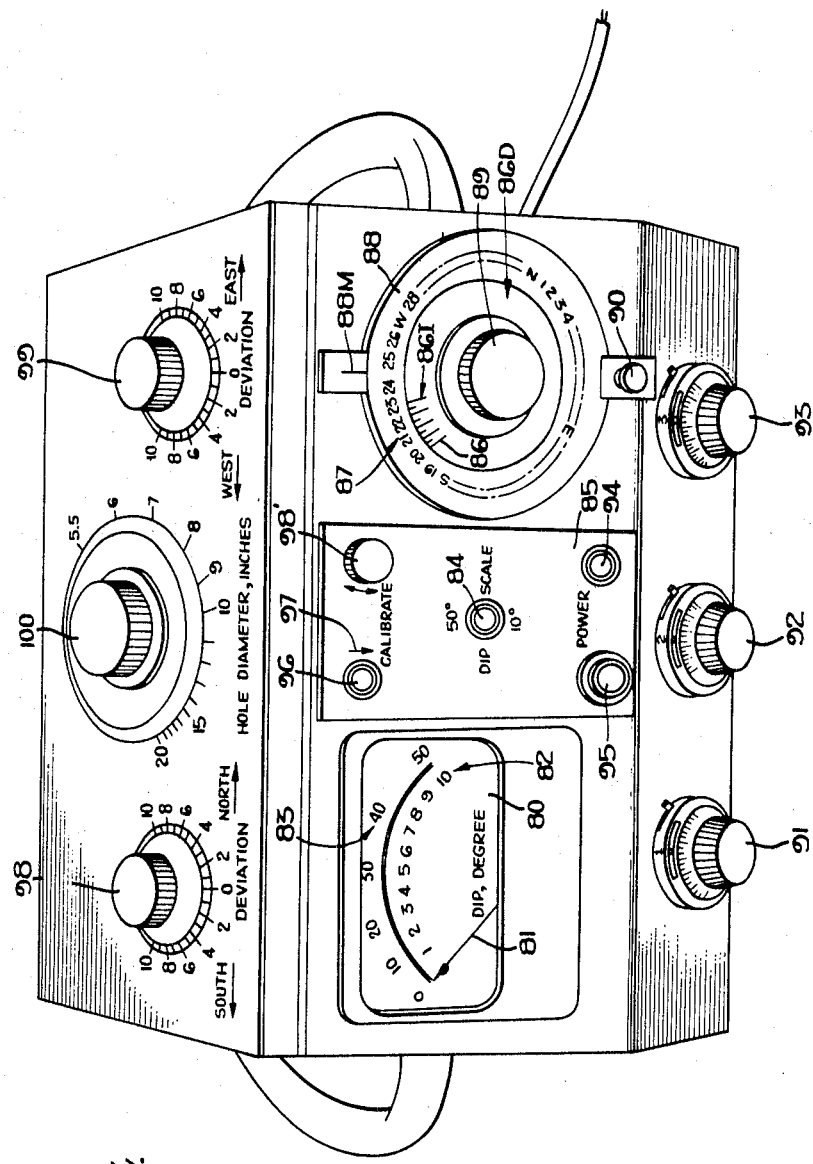
FIG. 4 is a perspective view of a control panel employed in the apparatus of the invention.

The manner in which the apparatus of the invention shown in FIG. 5 is employed will be better understood in connection with the description of the control panel employed with the apparatus of the invention, this control panel being shown in the perspective view of FIG. 4. The control panel shown in FIG. 4 will be better understood by an explanation of results which may be obtained through the use of it. In the first place, it is provided with an ammeter 80 having an index 81 to permit angle determinations from a 10° scale 82 and a 50° scale 83. A larger scale may be provided if desired.

The dip angle of a formation is read directly on ammeter 80. It is calibrated in a non-linear manner because of the non-linear character of Equation 5 and the arctan F function equal to $\alpha_a$ at $F = F_{max}$. Scale ranges are changed by means of a toggle switch 84 on a central portion 85 of the control panel.

The azimuth of a formation is read by comparing an index mark 86 to indicia 87 on an outer disc 88, index mark 86 being a part of indicia 86I on an inner disc 86D which may be turned by means of knob 89. Disc 88 is rotatable independently of disc 86D. Disc 88 is thus rotated to a position in visual correspondence to an index mark 88M corresponding to the azimuth of a reference electrode set. Indicia 86I provides for corrections due to differences in magnetic north by virtue of the geographical location in which electrical logs were made. That is, the geographical location of the well in which corresponding electrical logs were made. A knob 90 is employed to tighten disc 88 rigidly and prevent its movement relative to the control panel.

The apparatus of the invention shown in FIG. 5 is calibrated according to the magnitude of the line voltage as follows.

A calibrate switch 96 is pulled down as indicated by arrow 97 on a central section 85 of the control panel. A control knob 98' is then turned until the ammeter 80 reads full scale exactly. This reduces input line voltage of transformer 78 to exactly 115 volts. A pilot light 95 is provided on section 85 of the control panel as is a power toggle switch 94.

The control panel is operated as follows. A distance corresponding to $d1$ in FIG. 2 is registered on the manually operable knob 91. A distance corresponding to $d2$ in FIG. 2 is registered on the manually operable knob 92. A distance corresponding to $d3$ is registered on the manually operable knob 93. A power switch 94 is operated and the pilot light 95 is viewed to determine whether the apparatus is operating properly. Dip scale switch 84 is switched to an appropriate position. To eliminate any ambiguity, switch 84 may be turned to the 50 degree scale first and then to the 10 degree scale if desired. North-south and east-west hole deviation knobs 98 and 99 are set corresponding to the recorded deviation for a particular depth at which differential depths $d1$, $d2$ and $d3$ were determined. The position of hole diameter knob 100 is also adjusted in the same way. Disc 88 is rotated so as to make scale 87 agree in azimuth with indicia 88M and knob 90 is then locked. Knob 89 is turned until a maximum reading is obtained on meter 80. This maximum reading may be read directly from the meter 80 as the dip angle of a formation represented by the three differential depths $d1$, $d2$ and $d3$ to which knobs 81, 92 and 93 were set respectively. The angular position of disc 88 which corresponds to index mark 86 will then indicate the azimuth of the particular formation.

Operation of the internal mechanism of the apparatus shown in FIG. 4 will now be better understood when a correspondence of parts is noted. In the first place, a potentiometer indicated at No. 1 is set by means of manual control knob 91. Similarly, potentiometers No. 2 and No. 3 are set by manual control knobs 92 and 93. Toggle switch 94 is also indicated in FIG. 5. A calibrate resistor 98 is given the same number as the knob 98 shown in FIG. 4. Pilot light 95 is again so indicated in FIG. 5. An adjustable tap is indicated at 100 on autotransformer 78 which moves in response to movement of knob 100 shown in FIG. 4. Dip scale toggle switch is again indicated at 84 in FIG. 5. Calibrate switch is also indicated at 96. Knob 89 is also indicated. Knobs 98 and 99 are employed to set two pairs of potentiometers 70 and correspond to north-south and east-west hole deviations, respectively.

The arrangement of resistors 57', 58' and 59 has not heretofore been explained. The analogy of their identical arrangement in correspondence to resistors 57, 58 and 59 will be obvious with the corresponding connections of fixed taps 54, 54', 55, 55' and 56, 56'. It is to be noted that four wipers 101 are provided on resistors 57', 58' and 59' which are mechanically turned by means of knob 89 shown also in the control panel of FIG. 4. Scale 88 is employed to turn wipers 101 to a position corresponding to the azimuthal position of electrode No. 1. The north-south and east-west hole deviations are then impressed upon corresponding ones of the resistors 57', 58' and 59' and, in turn, combined with input voltages from input impedances 75 and impressed on resistors 57, 58 and 59 to produce a maximum reading on ammeter 80 at which point $\theta = \theta_m = \beta$. The geometric analogy of the arrangement of the electrical resistors forming the circuit of FIG. 4 is obvious in view of the rectangular coordinate components of the north-south and east-west deviations of a hole and their corrections for changes in the azimuth of electrode set No. 1.

The apparatus shown in FIG. 5 thus produces a direct indication of the dip angle of a formation and its azimuth. This is corrected all the while by deviations in the hole inclination, changes in the azimuth of a reference electrode No. 1, and changes in the hole diameter.

All calibrations may, of course, be adjusted for changes in magnetic north with geographic position. A vernier scale 86I is, in fact, preferably provided on the control panel for this purpose.

It is to be noted that a great many variations, changes and modifications of the invention may be made without departing from the true scope thereof. As stated previously, the angle of fixed taps 54, 54', 55, 55' and 56, 56' should be 120° apart. Alternatively, they may be at different angles although this is not generally desired. The main limitation on them is that they should be at the same angles at which electrodes are disposed in a well when the electrical logs shown in FIG. 1 are taken. It is to be noted that at least some finite resistance 64, 73 or 74 should be provided between wipers 61 indicated in both FIGS. 3 and 5 in order to make the maximum reading of ammeter 62 or 80 an unambiguous single point maximum. As stated previously, the resistances of all the circuit elements shown in any of the figures of the drawings may be varied to minimize error of a particular one of the two angles to be determined. In addition, the geometrical configuration of the resistors may be varied. Still further, any type of continuous impedance assembly may be provided, for example, capacitors in parallel or inductors in series. The principle of the invention resides in the use of wiper contacts or detection elements for these impedance elements located substantially 180° apart.

Figure 6:
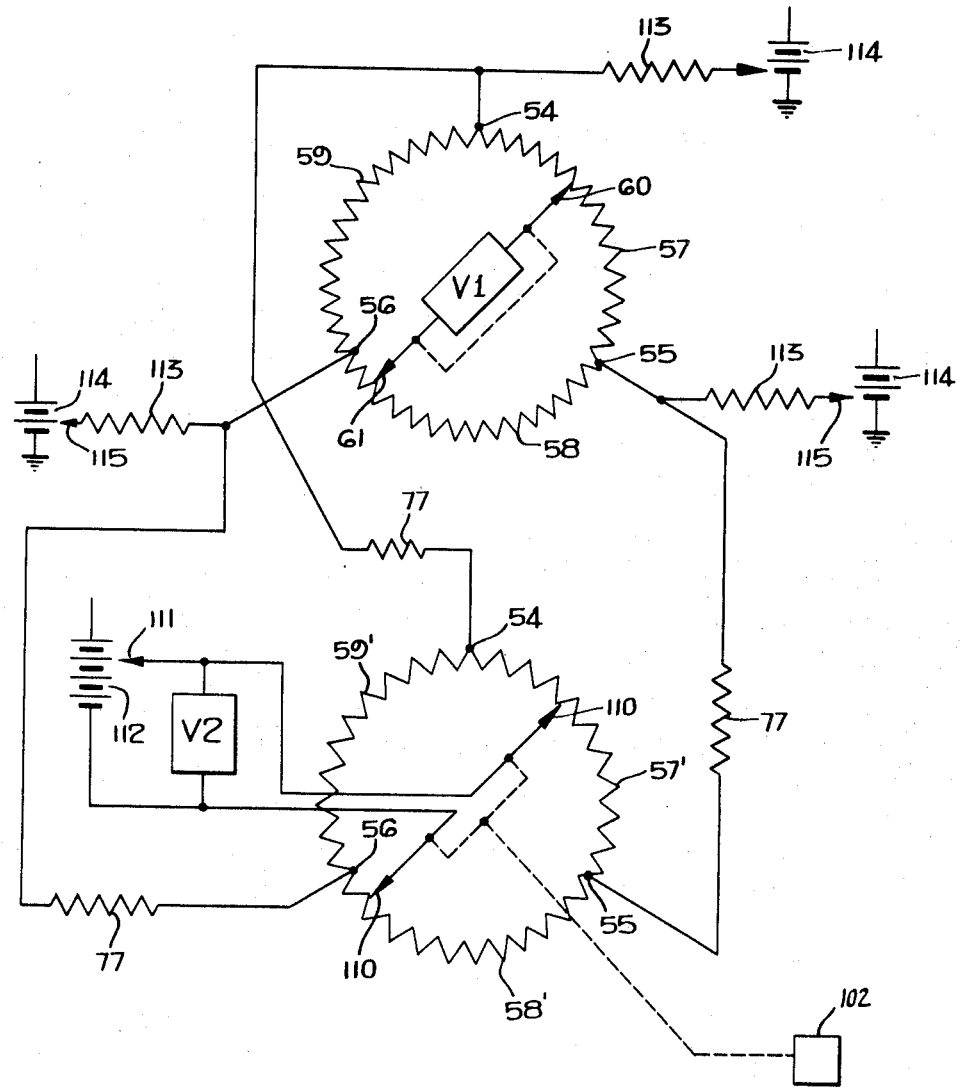
FIG. 6 is a schematic diagram of still another embodiment of the invention.

Although they obviously are uniformly wound, and are preferably made this way, resistors 57, 57', 58, 58' and 59, 59' may be wound especially to minimize error. The prime requirements of the impedance elements are that there be three and that there be three potential sources to apply three voltages corresponding to the differential depths $d1$, $d2$ and $d3$. As stated previously, instead of recording hole deviations in terms of north-south and east-west components of deviation, the dip of the hole axis may be recorded and then the azimuth corrections of electrode No. 1, if any is necessary, may be made in the usual manner, i.e. by turning knob 102. In this latter case, as shown in FIG. 6, only two wipers 110 are employed on resistors 57', 58' and 59', both of which are turned to an angular position by means of the same knob 102. A movable tap 111 then will be set on a potential source 112 so that a voltmeter V2, connected across the output therefrom, will read an angle corresponding to the inclination angle of the hole axis. Appropriate voltages will then be supplied to fixed taps 54, 55 and 56 shown on resistors 57, 58 and 59 in FIG. 6 via resistors 77. It is to be noted that resistors 77 with three corresponding resistors 113 form adding circuits, the output sum signals of which are applied to fixed taps 54, 55 and 56. Three sources of potential 114 are also provided for inputs to fixed taps 54, 55 and 56 on which movable taps 115 are provided to add a voltage to the voltage supplied by resistors 77 corresponding to the differential depth $d1$, $d2$ and $d3$ illustrated in FIG. 2. Wipers 60 and 61 are then turned to an angle corresponding to $\beta$ where a voltmeter V1 connected between them reads a maximum value. Voltmeter V1 is then preferably calibrated in degrees to read the dip angle of a formation directly at its maximum reading.

Figure 7:
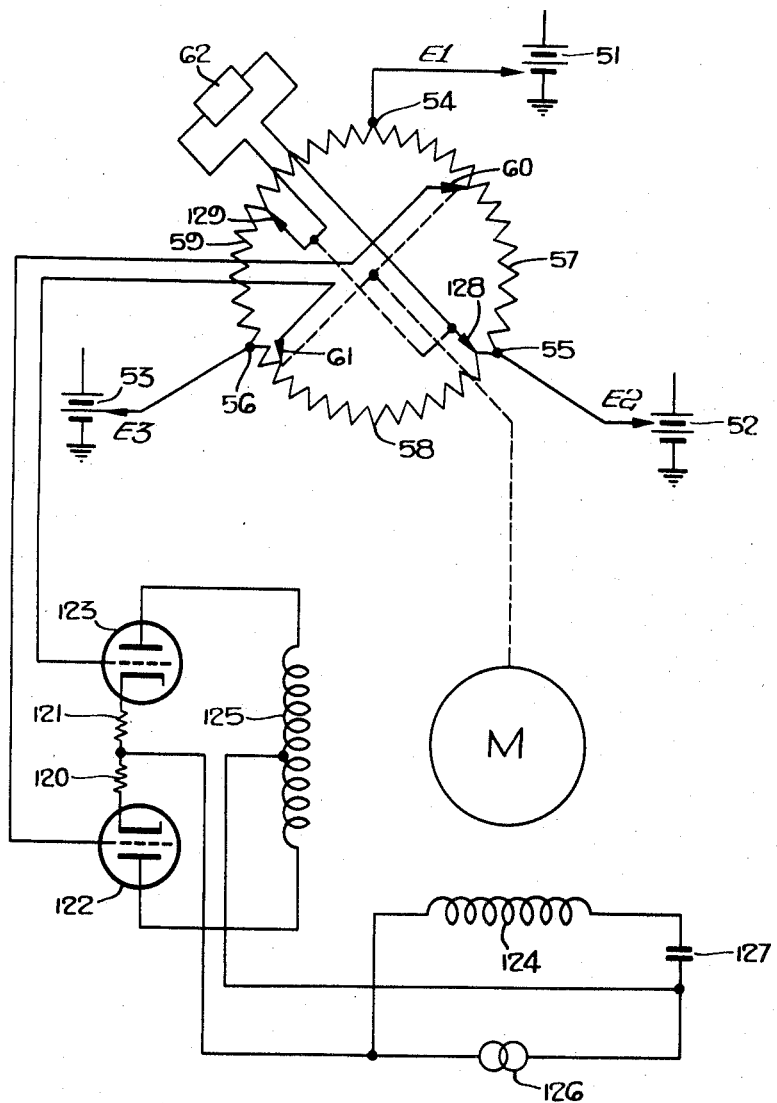
FIG. 7 is a schematic diagram of an alternative embodiment of the invention utilizing a servo to produce an automatic indication of the dip angle and azimuth of a fault or layer of strata intersected by the bore hole of an oil well.

As stated previously, it is not absolutely necessary to adjust the position of wipers 60 and 61 manually to obtain appropriate azimuthal reading for a formation from disc 88 and a dip reading from ammeter 80. Such a modification of the arrangement shown in FIG. 3 is also shown in FIG. 7. In FIG. 7, wipers 60 and 61 are turned mechanically by means of a split-phase motor M. Two field windings 124 and 125 are provided for motor M, the field windings having inputs from a common alternating current source 126. The phase of the alternating signal impressed on winding 124 leads that of the signal impressed upon winding 125 by an amount corresponding to the magnitude of a capacitor 127 serially connected with winding 124. The alternating signal of source 126 is impressed between a common juncture of the resistors 120, 121 and a center tap on winding 125. Hence, when one wiper contact of the pair 60 and 61 becomes positive with respect to the other, motor M turns the wipers in one direction and when said one of the contacts 60, 61 becomes negative with respect to the other, the motor M turns both wipers in the opposite direction. This means that preferably wiper contacts 60 and 61 are driven to a null position where a 0 voltage is generated across them. Thus, the dip angle of a formation must be read at a voltmeter 62 connected to a pair of wiper contacts 128 and 129 fixed 90 mechanical degrees from wipers 60 and 61, but fixed to a common drive shaft 130 of motor M. The apparatus shown in FIG. 7 is thus a servo system adapted to position wipers 128 and 129 at a position corresponding to the azimuth of a formation so that voltmeter 62 will read the dip angle of the formation simultaneously and instantaneously with any given group of settings of variable potential sources 51, 52 and 53.

Figure 8:
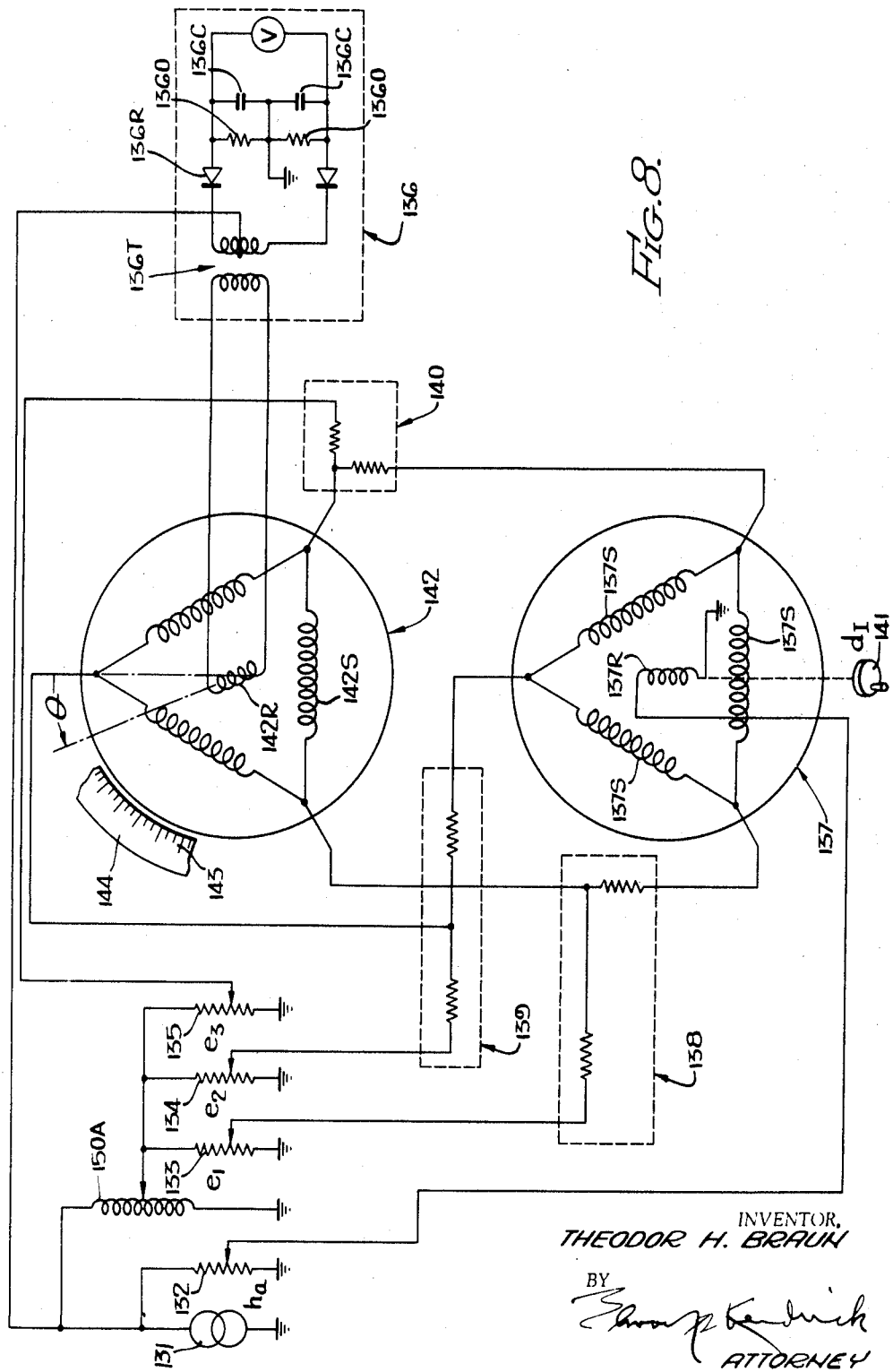
FIGS. 8 and 9 are still other embodiments of the invention.

In FIG. 8, alternating current source 131 is provided for producing output signals $h_d$, $e_1$, $e_2$ and $e_3$ from corresponding potentiometers 132, 133, 134 and 135. Potentiometers 133, 134 and 135 are connected across an auto-transformer 150A for division by $r$. It is to be noted that this division may be made at the tan $\alpha_a$ output of this embodiment of the invention and that shown in FIG. 9 where autotransformer 150A is again shown. The output of source 131 is also impressed upon a center tap on a secondary of a transformer 136T in a phase detector and indicating circuit 136 which is conventional. Circuit 136 is provided with rectifiers 136R, output resistors 136O, output capacitors 136C and a D.C. voltmeter V having plus and minus deflection scales for indicating the positive or negative dip angle of a formation. Voltmeter V may thus be directly calibrated. Voltages $e_1$, $e_2$ and $e_3$ are proportional in amplitude to distances $d_1$, $d_2$ and $d_3$, respectively, as before. Voltage $h_a$ is equal to the square root of the sum of the squares of $h_E$ and $h_N$, where $h_E$ is a voltage proportional to the east-west deviation of the well bore axis, and $h_N$ is a voltage proportional to the north-south deviation of the well bore axis. Voltages $e_1$, $e_2$ and $e_3$ are added to output voltages of a selsyn generator 137, in corresponding analogue adders 138, 138 and 140. Selsyn generators and receivers are well known in the art and need not be explained in detail for this reason. Selsyn generator 137 is provided with a rotor winding 137R which is energized by a voltage proportional to the position of the movable tap on potentiometer 132.

Figure 9:
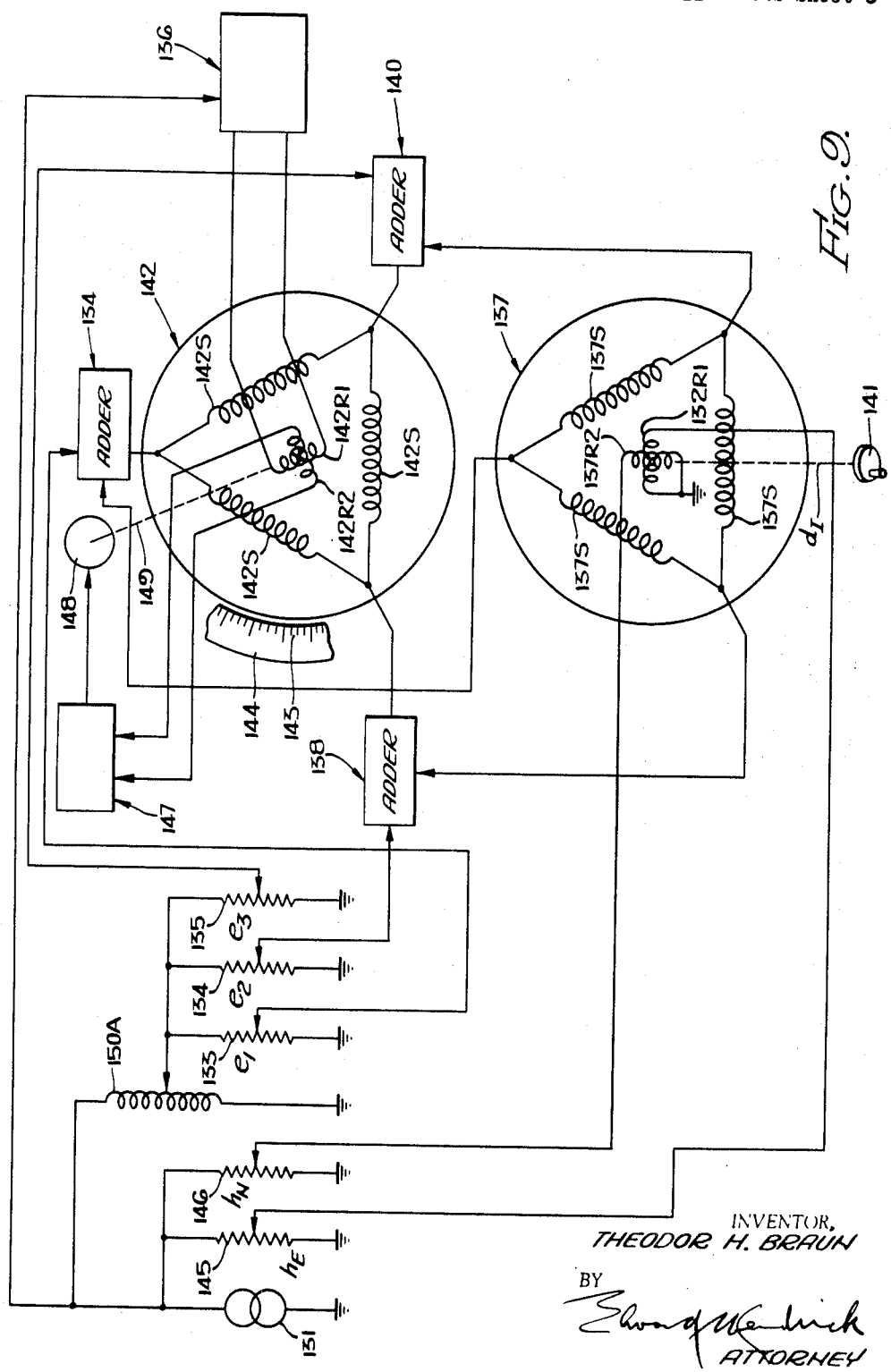

The angular position of selsyn rotor 137R is adjusted by means of a hand wheel 141. It is to be noted that in certain respects, the embodiment shown in FIGS 5 and 9 are similar and that the embodiments shown in FIGS. 6, 8 and 11 are similar. That is, each of these introduce correction for hole deviation in two different manners. For this same reason, the construction of each set of embodiments is somewhat different. In the first place, information provided by electrical logs concerning hole deviation in terms of orthogonal components with which the apparatus shown in FIGS. 5 and 9 may be employed gives this hole deviation amplitude components in terms of true north. However, the amplitude of hole deviation which is normally obtained from logging apparatus when it is given in terms of amplitude and direction is given in terms of amplitude and direction relative only to the position of a particular reference electrode such as electrode No. 1. For this same reason, in the embodiment shown in FIG. 5, disc 88 is directly connected to the means for rotating the set of four wipers 101 on the lower hole deviation potentiometer shown in FIG. 5. Similarly, indicator disc 144 is directly connected to the rotor 137R2 of selsyn 137 shown in FIG. 9. However, this is not true for the embodiments of the invention shown in FIGS. 6, 8 and 11. No disc corresponding to disc 88 is shown in FIG. 6 but will naturally be provided. However, due to the fact that hole deviation in terms of magnitude and direction is generally given relative to the position of the reference electrode No. 1, the wipers 110 on the lower potentiometer shown in FIG. 6 will be movable independently of any indicator disc similar to disc 88 shown in FIG. 4 which is used with the embodiment of the invention shown in FIG. 6. Similarly, indicator disc 144 will not be mechanically or in any way connected to the rotor 137R of the hole deviation lower selsyn generator 137 shown in FIG. 8. The same is true of the rotational position of the wipers on the lower hole deviation potentiometer and the indicator disc employed with the embodiments of the invention shown in FIGS. 10 and 11. This azimuth is indicated by $a_1$. The sum of $e_1$, $e_2$ and $e_3$ and a corresponding one of the three outputs of selsyn generator 137, respectively, are impressed upon a selsyn receiver 142. Selsyn 142 is provided with a rotor winding in 142R. The mechanical position of rotor winding 142R for a maximum output signal is compared with indicia 143 on an indicator 144 and thus provides an indicator of $\theta$. The output of rotor winding 142R is also impressed upon a primary winding of transformer 136T in phase detector and indicating means 136. The voltage output of rotor winding 142R is proportional to tan $\alpha_a$.

Selsyns 137 and 142 are provided respectively with stator windings 137S and 142S, rspectively, which are conventional. With the apparatus shown in FIG. 8, a perfect analog of the function $F = \tan \alpha_a \cos (\beta - \theta)$ may be generated. That is, a perfect analog may be produced by the use of the selsyns 137 and 142.

An arrangement is shown in FIG. 9 which is very similar to that shown in FIG. 8. Instead of $h_d$ being an input from potentiometer 132, two potentiometers 145 and 146 are provided respectively to produce signals proportional to $h_E$ and $h_N$ respectively. These are impressed upon two rotors 137R1 and 137R2 of selsyn 134 which are disposed at 90 mechanical degrees with respect to each other. Both selsyns 137 and 142 are shown in FIG. 9 including same stators 137S and 142S shown respectively in FIG. 8. Adders 138, 139 and 140 are also shown in FIG. 9 with phase detector and indicating circuit 136 shown in block diagram form. The output of rotor winding 142R1 of selsyn receiver 142 may still be connected to the primary winding of transformer 136T, phase detecting and indicating circuit 136 being identical to that shown in FIG. 8. However, selsyn receiver 142 is provided with an additional rotor winding 142R1 disposed at 90 mechanical degrees with respect to the position of rotor winding 142R1. Rotor winding 142R2 is connected to a servo 147 operating a servo motor 148 to drive the rotor of selsyn 142 only indicated by a schematic dotted line of shaft 149. The shaft 149 is thus turned until the output of rotor winding 142R1 is equal to zero. This means that the output of rotor winding 142R1 will be a maximum and proportional to the dip angle of a formation having $e_1$ proportional to $d_1$, $e_2$ proportional to $d_2$, and $e_3$ proportional to $d_3$, as previously explained. Thus, the arrangement of FIG. 7 may closely resemble the servo arrangement of servo 147 and servo motor 148. It can be easily shown that the selsyn generator and receiver arrangement shown in FIGS. 8 and 9 are perfect analogs of the desired function $F = \tan \alpha_a \cos (\beta - \theta)$. It can be understood simply by inspection of vector relationships of input signals to the selsyn generator and receiver.

Figure 10:
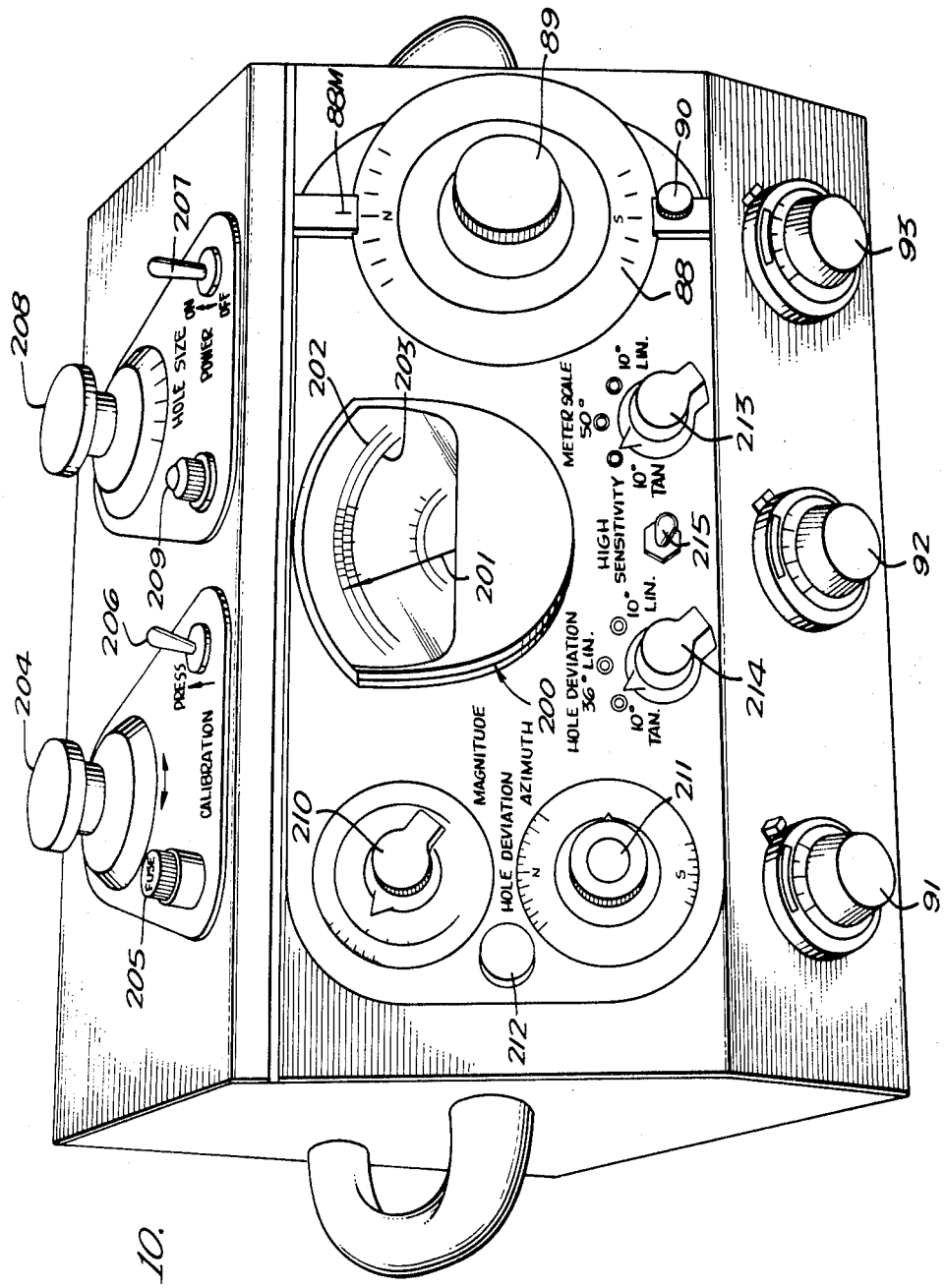
FIG. 10 is a perspective view of another embodiment of the invention.
Figure 11:
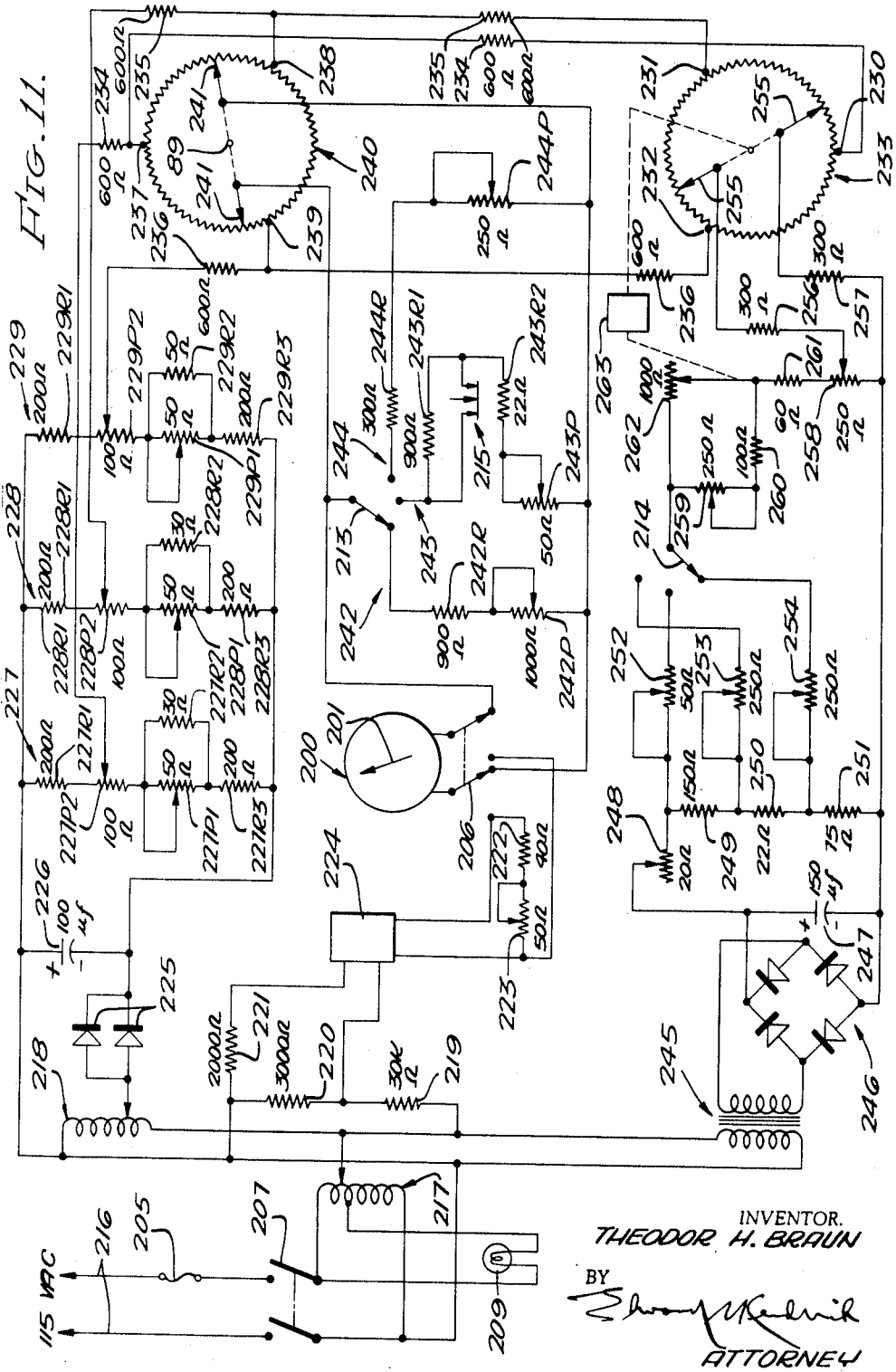
FIG. 11 is a schematic diagram of apparatus which may be employed with the embodiment shown in FIG. 10.

In the embodiment shown in FIG. 10, knobs 88, 89, 90, 91, 92 and 93 are substantially identical with those shown in FIG. 4. However, most of the other external equipment shown in FIG. 10 has been changed. In the first place, a meter is provided as indicated at 200 having an indicator arm 201 to indicate a dip angle on both a linear scale 202 and a nonlinear or tangent function scale 203. The utility of both of the scales 202 and 203 will be evident from an explanation which will be made hereinafter. The unit is calibrated by a calibrate knob 204 which has a function similar to that of calibrate knob 98′ shown in FIG. 4. A fuse plug 205 is located adjacent calibrate knob 204 and a calibration toggle switch 206 is located to the right of fuse plug 205. A toggle power switch 207 is located on the right side of a hole size knob 208, on the left side of which an indicator light 209 is provided. The magnitude of hole deviation is set by a knob 210 located directly above a hole deviation direction knob 211. A knob 212 is geared to knob 211 and provided a vernier rotation thereof.

Meter 200 has a switch electrically associated with it to make it more sensitive and also to cause it to read accurately on either the linear scale 202 or the tangent scale 203. This switch is indicated at 213 in FIG. 10. Similarly, the internal structure of the apparatus shown in FIG. 10 is adapted to compensate for hole deviations of a magnitude from zero to ten degrees or from ten to thirty-six degrees. That is, hole deviations having a sloping magnitude of from zero to ten degrees or ten to thirty six degrees. For this reason, a selection switch 214 is also provided.

In the operation of the instrument shown in FIG. 10, the power switch 207 is turned on, the calibration switch 206 is pressed forward and knob 204 is turned until meter 200 reads properly for zero input conditions. Hole deviation magnitude will be known. The operation of the embodiment shown in FIG. 10 from this point will depend upon whether or not hole deviation magnitude is greater or less than ten degrees. It will be first assumed that it is less than ten degrees. Later on, an explanation will be made of the operation of the apparatus shown in FIG. 10 when the hole deviation is greater than ten degrees. When it is less than ten degrees, knob 210 is set according to hole deviation magnitude and knob 211 is set according to hole deviation direction. Knob 214 is set on the ten degree tangent mark. Meter scale switch 213 is normally set on the fifty degree mark at first. Hole size is adjusted by knob 208 and knobs 91, 92 and 93 are set in accordance with information obtained from the electrical log at a particular depth in a well. If meter knob 213 is turned to the fifty degree mark and index 201 of meter 200 shows less than ten degrees, more sensitivity may be obtained by switching to the ten degree tangent mark of the knob 213. Disc 88 will be set to correspond to the angular position of electrode No. 1 relative to true north. Disc 88 is then fixed in position by knob 90. Knob 89 is then rotated until index 201 moves to a maximum position. The dip angle is then read at the maximum point of index 201 on the tangent scale 203.

Normally, it is desirable to obtain the direction of inclination by the null method causing index 201 to go to zero and by reading an angle ninety degrees from where this indication normally would be, as explained previously. This is done simply by rotating knob 89 until the needle 201 falls to zero. Due to the tangent function which must be generated by the use of "resolver potentiometers," error is encountered at high hole deviations. Compensation for this error may be easily made in accordance with the following method. In the first place, correction should be made with the apparatus shown in FIGS. 10 and 11 when the hole deviation is over ten degrees in magnitude. When such is the case, hole deviation magnitude knob 210 is set to zero. In this case, the position of knobs 211 and 214 initially is immaterial. Meter scale switch 210 is then again set on the fifty degree mark as before and $d_1$, $d_2$ and $d_3$ are set in accordance with knobs 91, 92 and 93. Disc 88 is set in the same manner as before and locked in position by knob 90. Hole size 208 is appropriately set and knob 89 is rotated until needle 201 reads a maximum value. If this maximum is less than ten degrees, of course again the meter scale switch 213 may be turned to the ten degree tangent mark as before. At any rate, the tangent scale 203 is read when needle 201 reaches a maximum value. This is called the uncorrected dip. Meter scale switch 213 is again rotated to the fifty degree position and hole deviation switch 214 is rotated to one of the thirty-six degree and ten degree linear marks. However, before hole deviation in terms of magnitude and direction is introduced as a correction to the data to be obtained through the use of knobs 210 and 211, hole size knob 208 is rotated in a direction and at a magnitude such that the previous maximum reading of needle 201 on nonlinear scale 203 is increased to the same reading on linear scale 202. After this has been done, hole deviation magnitude and azimuth are applied to the computation through the use of knobs 210 and 211. The answer of dip angle is then determined by the maximum reading of needle 201 on the linear scale 202 only. The direction of inclination is obtained as before by rotating knob 89 until needle 201 reads zero. For better accuracy in determining a direction of inclination, a highly sensitive switch 215 is provided which may be momentarily actuated to cause meter 200 to be highly sensitive to movement of knob 89.

The internal circuitry of the embodiment of the invention shown in FIG. 10 is illustrated in FIG. 11. Input leads 216, which are adapted to receive one hundred fifteen volts A.C., are connected through fuse 205 to power switch 207. Indicator light 209 is connected across some of the turns of an autotransformer 217 adjustable with knob 204. A second transformer 218 is provided which is adjustable with knob 208. A calibrate circuit is provided for meter 200 connected to calibrate switch 206 including resistors 219, 220, 221 and 222 with a potentiometer 223 and a rectifier 224. The output of variable inductor 218 is connected through a set 225 of parallel connected diodes across a capacitor 226. The output from the capacitor 226 is then connected across three parallel connected circuits 227, 228 and 229, each having corresponding series resistors 227R, 228R, and 229R, respectively, and series potentiometers 227P, 228P, and 229P. Potentiometers 227P1, 228P1 and 229P1 are calibrating potentiometers. Potentiometers 227P2, 228P2 and 229P2 are all adjustable with knobs 91, 92 and 93, respectively, in the same manner as explained previously. The outputs of potentiometers 227P2, 228P2 and 229P2 are combined with the outputs from fixed taps 230, 231 and 232 on a lower potentiometer 233 by means of pairs of resistors 234, 235, and 236, respectively. The sum voltages at the mutual junctions of resistors 234, 235 and 236 are then applied to corresponding fixed taps 237, 238 and 239 on an upper potentiometer 240.

Similar to the embodiment shown in FIG. 5, potentiometer 240 is provided with two movable taps or wipers 241 disposed one hundred eighty degrees apart and mechanically connected to knob 89. Similar to the embodiment shown in FIG. 5, meter 200 is connected between wipers 241. Meter 200 is provided with three shunt circuits 242, 243 and 244 operative depending on the position of scale switch 213. Circuit 242 includes a resistor 242R, a potentiometer 242P, potentiometer 242P being used as a calibrate potentiometer. Similarly, shunt circuit 243 includes two resistors 243R1, 243R2 and a potentiometer 243P, potentiometer 243P also being employed as a calibrate potentiometer. High sensitivity switch 215 is connected across resistor 243R1 and is normally closed to bypass it, the opening of switch 215 causing a substantially higher shunt resistance to be included in shunt circuit 243. Shunt circuit 244 includes a resistor 244R and a calibrate potentiometer 244P. Shunt circuits 242, 243 and 244 respectively provide shunts for meter 200 to cause it to read on the ten degree tangent scale, the fifty degree scale, and the ten degree linear scale corresponding to the ten degree tangent mark, the fifty degree mark and the ten degree linear mark on meter switch 213 shown in FIG. 10.

An input to lower potentiometer 233 to correct for hole deviation is initially provided from a transformer 245 having a primary connected across the output of autotransformer 217 and having a secondary connected across a full wave rectifier 246.

Rectifier 246 is connected across a capacitor 247 to a calibrating potentiometer 248. Connected in parallel with capacitor 247 and potentiometer 248 are three resistors 249, 250 and 251. Directly connected from potentiometer 248 is a calibrate potentiometer 252 connected serially with a thirty-six degree input to hole deviation switch 214. A calibrate potentiometer 253 is provided serially with the ten degree linear input to hole deviation switch 214 and a calibrate potentiometer 254 is provided with a ten degree tangent input to hole deviation switch 214. An input is provided to two wipers 255 on potentiometers 233 identical to wipers 241 on potentiometers 240 through a pair of resistors 256 and 257 connected from a potentiometer 258 which is variable with knob 210 shown in FIG. 10. A calibrate potentiometer 259 with a pair of resistors 260 and 261 are connected serially with potentiometer 258. A potentiometer 262 is connected in parallel with the series connection of potentiometer 259 and resistor 260. Potentiometer 262 is mechanically varied in accordance with the output of a gear box 263 mechanically geared with knob 211 which is employed to rotate wipers 255. The geared connection of potentiometer 262 with knob 211 reduces the error of hole deviation correction to a substantial further degree.

Figure 12:
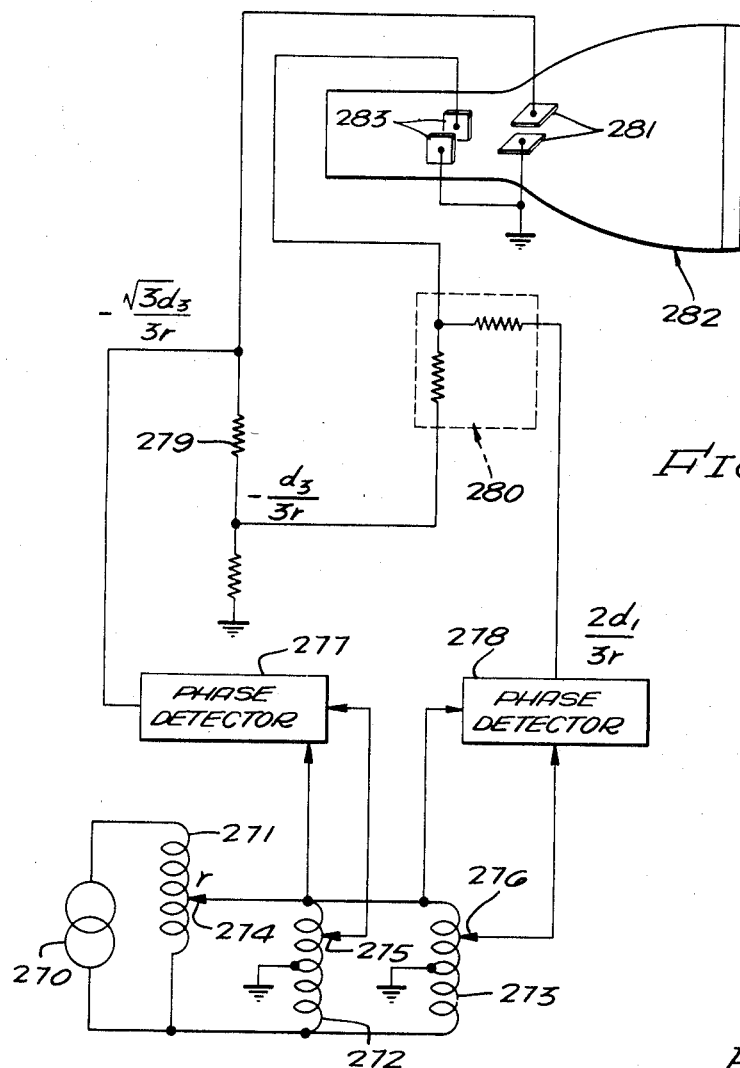
FIG. 12 is a schematic diagram of still another embodiment of the invention.

Still another embodiment of the invention is shown in FIG. 12 including an alternating current source 270 for applying an alternating voltage to an autotransformer 271. A pair of autotransformers 272 and 273 are then connected from a movable tap 274 on autotransformer 271 to its lower end. Movable taps 275 and 276 are provided on autotransformers 272 and 273, respectively, which are connected to phase detectors 277 and 278, respectively, which also receive inputs from the movable tap 274 on autotransformer 271. The position of movable tap 274 on autotransformer 271 is adjusted in accordance with well bore radius. Similarly, the positions of movable taps 275 and 276 are adjusted in accordance with the distance $d_3$ and $d_1$ when $d_2=0$. This may be done when curves numbers 3 and 1 are compared with curve number 2, as shown in FIG. 1. Optical apparatus for such curve comparison is described and claimed in U.S. Patent No. 3,055,261 issued September 25, 1962, to Theodor H. Braun for Optical Apparatus for Curve Comparison.

$$\frac{\partial z}{\partial y} = \sqrt{3}\frac{d_2-d_3}{3r}$$

$$\frac{\partial z}{\partial x} = \frac{2d_1-d_3-d_3}{3r}$$

However, when $d_2=0$, $$\frac{\partial z}{\partial y} \text{ simply become } \sqrt{3}-\frac{d_3}{3r}$$

and $$\frac{\partial z}{\partial x} \text{ becomes } \frac{2d_1-d_3}{3r}$$

Thus, the circuit constants of the arrangement shown in FIG. 12 are selected such that the output of a detector 227 is proportional to $$-\sqrt{3}\frac{d_3}{3r}$$

A fraction of the signal proportional to $$-\frac{d_3}{3r}$$

is then taken by a fixed voltage divider including resistors 279 shown in FIG. 12.

$$-\frac{d_3}{3r}$$

is then added to $$\frac{2d_1}{3r}$$

the output of phase detector 278 in an adder 280.

$$-\sqrt{3}\frac{d_3}{3r}$$

is applied directly to one of a pair of vertical plates 281 of a cathode-ray tube 282. One of horizontal deflection plates 283 is then connected to the output of adder 280.

The other of deflection plates 281 and 283 are connected to ground. The center taps of autotransformers 272 and 273 are grounded to provide alternately positive or negative outputs at phase detectors 277 and 278, depending upon whether $d_3$ and $d_1$ are positive or negative with respect to $d_2$.

Figure 13:
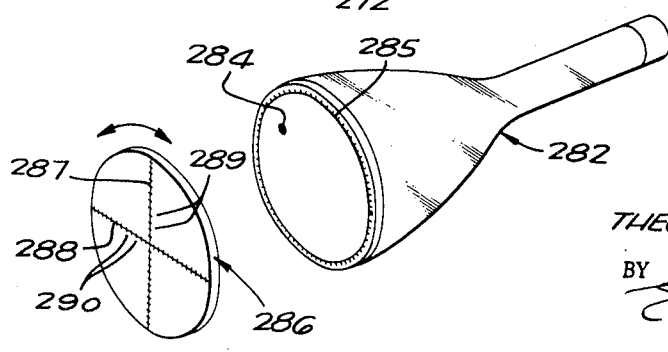
FIG. 13 is a perspective view of the apparatus which may be employed with the embodiment shown in FIG. 12.

A spot will appear on cathode-ray tube 282 as indicated at 284 in FIG. 13 which will then have an angular position around the tube identical with that of direction of inclination. This may be read directly from indicia provided for that purpose at 285 on tube 282. Correspondence of dot 284 with indicia 285 may be made by the use of a cup-shaped disc 286 to fit over the face of cathode-ray tube 282 as shown in FIG. 13 having perpendicular lines 287 and 288 thereon through the center thereof which may be rotated with disc 286 until one lies directly over spot 284 and extends to indicia 285. Depending upon how indicia indicated at 289 and 290 are arranged on lines 287, either the tangent of the dip angle or the dip angle itself may read directly from indicia 289 or 290 depending upon where spot 284 appears along either line 287 or line 288.

From the comparison of FIG. 12 with the other embodiments of the invention shown and described herein, it will be apparent that the present invention involves an entirely new concept in means for and methods of calculating the angle of inclination and direction of inclination of a plane relative to an orthogonal set of coordinate axes by the use of three measured distances normal to a reference plane through three points therein equidistant from an origin. It is to be noted that the angular position of these points may be any desired positions and that they determine only the angles of certain vectors to be added. In fact, the new concept presented by the invention is that the solution to the following vector equation will given the magnitude and direction of dip:

$$\bar{v} = \bar{a} + \bar{b} + \bar{c} \qquad (6)$$

where $\bar{v}$ is a vector having a magnitude $Kr \tan \alpha_a$ at an angle $\beta+90$ in degrees from a reference axis and $\bar{a}$, $\bar{b}$ and $\bar{c}$ are vectors of magnitudes $(d_1-d_2)$, $(d_2-d_3)$ and $(d_3-d_1)$, respectively, located at different angles corresponding to those of the electrodes that are located around the electrical logging tool. For the present these angles will be identified as $\epsilon$, $\gamma$ and $\Delta$, respectively. However, careful attention should be given to the fact that $d_1$ is measured at $\gamma$, $d_2$ at $\Delta$, and $d_3$ at $\epsilon$ although vector $(d_1-d_2)$ is located at $\epsilon$, $(d_2-d_3)$ at $\gamma$, and $(d_3-d_1)$ at $\Delta$. In this case, K is defined as follows:

$$K = \sin(\gamma-\Delta) + \sin(\Delta-\epsilon) + \sin(\epsilon-\gamma) \qquad (7)$$

From the foregoing, it will be appreciated that a triple vector adder may be employed with the invention and the output thereof easily calibrated to read the terms of $\alpha_a$ and $\beta$. The factor K is, of course, constant because $\gamma$, $\Delta$, and $\epsilon$ are constant during a single logging operation and during subsequent computations.

Equation 6 may be easily proved by returning to the general equation of a plane in orthogonal coordinates:

$$Ax + By + Cz = D \qquad (8)$$

dividing by D $$\frac{A}{D}x \times \frac{B}{D}y + \frac{C}{D}z = 1 \qquad (9)$$

and substituting $$f = \frac{A}{D}, g = \frac{B}{D} \text{ and } h = \frac{C}{D}$$

$$fx + gy + hz = 1 \qquad (10)$$

Polar coordinates are usually designated $\rho$ and $\theta$; however, to distinguish from $\theta$ defined previously herein, although they are substantially the same, coordinates $\rho$ and $\phi$ are chosen. Equation 10 in polar coordinates is as follows because $x=\rho \cos \phi$ and $y=\rho \sin \phi$:

$$\rho(f \cos \phi + g \sin \phi) + hx = 1 \quad (11)$$

Three points in the plane of Equation 11 which could be derived from an electrical log in terms of $(\rho, \phi, z)$ are $(r, \gamma, d_1)$, $(r, \Delta, d_2)$, and $(r, \epsilon, d_3)$. By substituting $\rho=r$, $\phi=\gamma$, $z=d_1$; $\rho=r$, $\phi=\Delta$, $z=d_2$; and $\rho=r$, $\phi=\epsilon$, $z=d_3$ in Equation 11 three equations may be set up with three unknowns $f$, $g$ and $h$, and $f$, $g$ and $h$ may be determined.

By definition previously made $$\tan \alpha_a = \left[\left(\frac{A}{C}\right)^2 + \left(\frac{B}{C}\right)^2\right]^{1/2} \quad (12)$$

and $$\tan \alpha = \frac{B}{A} \quad (13)$$

However, $$\frac{A}{B} = \frac{B}{D} \div \frac{C}{D} = \frac{f}{h}$$

and $$\frac{B}{C} = \frac{B}{D} \div \frac{C}{D} = \frac{g}{h}$$

and $$\frac{B}{A} = \frac{B}{C} \div \frac{A}{C} = \frac{g}{h} \div \frac{f}{h} = \frac{g}{f}$$

Using the three equations and solving for the three unknowns $f$, $g$ and $h$ mentioned above and then solving for the three ratios $$\frac{f}{h}, \frac{g}{h}, \text{ and } \frac{g}{h}$$

the following is derived:

$$\frac{g}{h} = -\frac{(d_1-d_2)\cos \epsilon + (d_2-d_3)\cos \gamma + (d_3-d_1)\cos \Delta}{r \sin(\gamma-\Delta) + \sin(\Delta-\epsilon) + \sin(\epsilon-\gamma)} \quad (14)$$

and $$\frac{f}{h} = \frac{(d_1-d_2)\sin \epsilon + (d_2-d_3)\sin \gamma + (d_3-d_1)\sin \Delta}{r \sin(\gamma-\Delta) + \sin(\Delta-\epsilon) + \sin(\epsilon-\gamma)} \quad (15)$$

and $$\frac{g}{f} = -\frac{(d_1-d_2)\cos \epsilon + (d_2-d_3)\cos \gamma + (d_3-d_1)\cos \Delta}{(d_1-d_2)\sin \epsilon + (d_2-d_3)\sin \gamma + (d_3-d_1)\sin \Delta} \quad (16)$$

From Equations 14, 15 and 16 it will be apparent that the solution for $\alpha_a$ and $\beta$ is only slightly different from a perfect vector solution. In the first place, the magnitude of $\bar{v}$ is not $\alpha_a$ or $\tan \alpha_a$ but $Kr \tan \alpha_a$ where $\bar{a}=(d_1-d_2)$ at angle $\epsilon$, etc. In the second place, the cosine terms are found in the numerator of Equation 16 and the sine terms in the denominator. In a conventional vector solution this is reversed with the sign of $f/g$ plus instead of minus. This means simply that the angle of the true vector $\bar{v}$ will be $(\beta+90)$ in degree instead of $\beta$.

Another way to express the result of the derivation of Equations 14, 15 and 16 is that the dip angle and azimuth of a formation is a solution of a right triangle having legs proportional to the right hand side of Equations 14 and 15.

In the embodiment of FIG. 12, the values and number of inputs may be changed with $d_2=0$ and with different angles $\gamma$, $\Delta$, and $\epsilon$. In the general case the voltage impressed upon the vertical set of deflection plates should be proportional to the right hand side of Equation 14 and the voltage on the horizontal set proportional to the right hand side of Equation 15 which is very easy to mechanize. Still further, when $\gamma=0$, $\Delta=120°$, and $\epsilon=-120°$;

$$\frac{g}{h} = \sqrt{\frac{3d_3}{3r}}$$

$$\frac{f}{h} = \frac{2d_1 - d_3}{3r}$$

which is still easier to mechanize.

As stated previously, many changes and modifications of the invention may be made by those skilled in the art without departing from the true scope thereof. Some of these changes and modifications have been illustrated and described; however, others will suggest themselves to those skilled in the art and the true scope of the invention should not be limited simply to those illustrated since they are shown merely for purposes of illustration. Hence, the true scope of the invention is defined only in the appended claims.

I claim:

1. Apparatus for determining information relative to oil and gas formations, said apparatus comprising: a potentiometer-like structure including a resistive winding arranged physically in a planar circle, said winding having mutually adjacent ends electrically connected together and having three terminal junctions disposed 120 mechanical degrees apart around it; an adjustable source of potential connected to each of said terminal junctions for impressing a corresponding potential on each, each of said potentials having a common signal level; a pair of wipers to slide around said winding in contact therewith and at positions thereon substantially 180 degrees apart; and a voltmeter having a finite series internal resistance electrically connected between said wipers.

2. Apparatus for determining information relative to oil and gas formations, said apparatus comprising: a potentiometer-like structure including a resistive winding arranged physically in a planar circle, said winding having mutually adjacent end electrically connected together and having three terminal junctions disposed 120 mechanical degrees apart around it; an independently adjustable source of potential connected to each of said terminal junctions for impressing a corresponding potential on each, each of said potentials having a common signal level; a pair of wipers to slide around said winding in contact therewith at positions thereon substantially 180 degrees apart; a voltmeter having a finite series internal resistance electrically connected between said wipers; and means for moving said wipers around said winding in the same direction simultaneously.

3. Apparatus for determining information relative to oil and gas formations, said apparatus comprising: a potentiometer-like structure including a resistive winding arranged physically in a planar circle, said winding having mutually adjacent ends electrically connected together and having three terminal junctions disposed 120 mechanical degrees apart around it; an independently adjustable source of potential connected to each of said terminal junctions for impressing a corresponding potential on each, each of said potentials having a common signal level; a first pair of wipers to slide around said winding in contact therewith at positions thereon substantially 180 degrees apart; a second pair of wipers to slide around said winding in contact therewith at positions thereon substantially 180 degrees apart, said second pair of wipers being disposed at an angle of 90 degrees with respect to said first pair of wipers; means responsive to the potential difference appearing between said second pair of wipers for moving all of said wipers substantially simultaneously in the same direction, said direction corresponding to the polarity of said predetermined potential difference, said means being responsive to said potential difference to move all four of said wipers until said potential difference becomes equal to zero; and means electrically connected between said first pair of wipers to indicate the potential difference appearing between them.

4. The invention as defined in claim 3, wherein means are additionally provided to indicate the angular position of said first pair of wipers relative to the position of said winding.

5. In apparatus for determining information relative to strata intersected by a well bore for use particularly in connection with information concerning the first, second and third distances of a first set of three points in a plane of selected strata from first, second and third corresponding points located at first, second and third different angular positions, respectively, around and equidistant from the axis of the well bore in a predetermined plane of reference perpendicular to the well bore axis and on lines through corresponding pairs of points perpendicular to said reference plane, the combination comprising: a potentiometer-like structure including a resistive winding arranged physically in a planar circle; said winding having its mutually adjacent ends electrically connected together, said winding having three terminal junctions disposed at the same relative angular positions as said first set of points; an independently adjustable source of potential connected to at least two of said terminal junctions for impressing potentials thereon proportional to at least two of said distances; a pair of wipers to slide around said winding in contact therewith at positions thereon substantially 180 degrees apart; and a voltmeter having a finite series internal resistance electrically connected between said wipers.

References Cited by the Examiner

UNITED STATES PATENTS

| | | | |
|---|---|---|---|
| 2,241,615 | 5/41 | Plebanski | 323—123 X |
| 2,465,624 | 3/49 | Agins | 324—90 X |
| 2,701,875 | 2/55 | Baltzer | 323—121 X |

WALTER L. CARLSON, *Priamary Examiner.*